(12) United States Patent
Rao et al.

(10) Patent No.: US 8,107,887 B2
(45) Date of Patent: Jan. 31, 2012

(54) NARROWBAND SYSTEM AND METHOD FOR DEFINING NARROWBAND WIDEBAND CHANNELS IN UNUSED WIDEBAND CHANNELS

(75) Inventors: Yadunandana N. Rao, Sunrise, FL (US); Apoorv Chaudhri, Cambridge, MA (US); Geetha K. Thampi, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 521 days.

(21) Appl. No.: 12/394,955

(22) Filed: Feb. 27, 2009

(65) Prior Publication Data

US 2010/0222007 A1 Sep. 2, 2010

(51) Int. Cl.
*H04B 17/00* (2006.01)
(52) U.S. Cl. ...................... 455/67.11; 455/509
(58) Field of Classification Search ............... 455/67.11, 455/67.14, 67.7, 226.1, 509, 516
See application file for complete search history.

(56) References Cited

U.S. PATENT DOCUMENTS

| | | | | |
|---|---|---|---|---|
| 7,120,437 | B2* | 10/2006 | Benson et al. ............... | 455/434 |
| 7,454,212 | B2* | 11/2008 | Li et al. ............... | 455/450 |
| 7,573,850 | B2* | 8/2009 | Li et al. ............... | 370/329 |
| 7,620,368 | B2* | 11/2009 | Wang et al. ............... | 455/67.11 |
| 2004/0081127 | A1 | 4/2004 | Gardner et al. | |
| 2005/0245258 | A1 | 11/2005 | Classon et al. | |
| 2006/0084444 | A1* | 4/2006 | Kossi et al. ............... | 455/450 |
| 2006/0092880 | A1 | 5/2006 | Nounin et al. | |
| 2007/0054626 | A1* | 3/2007 | Li et al. ............... | 455/69 |
| 2008/0222020 | A1* | 9/2008 | Stanforth et al. ............... | 705/37 |
| 2009/0270025 | A1* | 10/2009 | Kossi et al. ............... | 455/3.01 |
| 2010/0266002 | A1* | 10/2010 | Du et al. ............... | 375/224 |

OTHER PUBLICATIONS

Linjun, L.V., et al, "Simulation Results for Spectral Correlation Sensing With Real TV Signals," [online] IEEE, Jul. 2007, [retrieved Feb. 26, 2009] retrieved from the Internet: <http://www.ieee802.org/22/Meeting_documents/2007_May/22-07-0034-02-0000_Huawei_Simulation_Results_Spectral_Correlation_Sensing.ppt>.
Quan, Z., et al, "Wideband Spectrum Sensing in Cognitive Radio Networks," [online] ICC '08. IEEE Int'l. Conf. on Communications, 2008, [retrieved Feb. 26, 2009] retreived from the Internet: <http://arxiv.org/PS_cache/arxiv/pdf/0802/0802.4130v1.pdf>.
Atia, G., et al, "Robust Energy Efficient Cooperative Spectrum Sensing in Cognitive Radios," [online] IEEE/Sp 14th Workshop on Statistical Signal Processing, pp. 502-506, Aug. 2007, [retrieved Feb. 26, 2009] retrieved from the Internet: <http://ieeexplore.ieee.org/iel5/4301199/4301200/04301309.pdf>.
Vistotsky, E., et al., "On Collaborative Detection of TV Transmissions in Support of Dynamic Spectrum Sharing," [online] IEEE DySPAN05, 2005, [retrieved Feb. 26, 2009] retrieved from the Internet: <http://ieeexplore.ieee.org/xpl/freeabs_all.jsp?tp=&arnumber=1542650&isnumber=32916>.
PCT/US2010/024384—International Search Report with Written Opinion mailed Aug. 30, 2010—8 pages.

* cited by examiner

*Primary Examiner* — Lincoln Donovan
*Assistant Examiner* — William Hernandez
(74) *Attorney, Agent, or Firm* — Barbara R. Doutre (57) ABSTRACT

A narrowband communication system (100) includes a base station (102) and a plurality of subscriber units (104). The base station assigns one or more wideband channels to be measured to each subscriber unit (606). The subscriber units tune to their assigned wideband channels and perform narrowband measurements, then report the results to the base station (612). The base station then analyzes the measurement results (614) and selects available wideband channels to be divided into narrowband channels for use by the narrowband system.

21 Claims, 6 Drawing Sheets

| |
|---|
| CHANNEL 1: $f_1$; sub{..} |
| CHANNEL 2: $f_2$; sub{..} |
| CHANNEL 3: $f_3$; sub{..} |
| CHANNEL 4: $f_4$; sub{..} |
| CHANNEL 5: $f_5$; sub{..} |
| CHANNEL 6: $f_6$; sub{..} |
| CHANNEL 7: $f_7$; sub{..} |
| CHANNEL 8: $f_8$; sub{..} |
| CHANNEL 9: $f_9$; sub{..} |
| CHANNEL 10: $f_{10}$; sub{..} |
| CHANNEL 11: $f_{11}$; sub{..} |
| CHANNEL 12: $f_{12}$; sub{..} |

500 — 502 (channels 1–8), 504 (channels 9–12)

NARROWBAND SYSTEM AND METHOD FOR DEFINING NARROWBAND WIDEBAND CHANNELS IN UNUSED WIDEBAND CHANNELS

FIELD OF THE INVENTION

The invention relates generally to radio communication systems and methods, and more particularly to identifying unused and available channels in a spectrum region normally used for wideband transmission that may be used for narrowband communication.

BACKGROUND OF THE INVENTION

With ever increasing demand for communication services, and the crowding of conventionally assigned spectrum, governments are allowing unlicensed communication operation in licensed, but under-utilized spectrum bands. One example of this is the recent Federal Communications Commission's decision to allow radio communication systems to use channels in the spectrum region designated for licensed television broadcast. In a given geographic region, there will typically be a number of television channels which are not presently being utilized for television transmission. These unused wideband 6 MHz channels may be made available for narrowband radio communication which may be 12.5 KHz to 150 KHz wide. Accordingly, there is a need to identify spectrum segments or channels conventionally licensed or utilized for one form of communication that may be used for alternative communication activity.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The invention solves the problem of identifying available channels or spectrum segments to be used for one form of communication in a spectrum region typically reserved or licensed for another form of communication by having base stations and/or subscriber units perform measurements in the target spectrum to identify potential channel candidates. Subscriber units, based on their geographic location, may be assigned one or more wideband channels in which to perform measurements to identify candidate wideband channels which do not have wideband channel activity and which may be used for a number of narrowband channels, or other wideband use. Subscriber units which are sufficiently co-located may be used to perform measurements on different channels, while subscriber units which are sufficiently separated may be used to perform measurements on the same channels to determine channel clarity throughout the serving area of the system. This is done to obtain uncorrelated measurements for a channel leading to cooperative sensing gain. Upon the subscriber units reporting the results of their assigned measurements, decisions may be made as to which wideband channels are presently available for secondary use based at least in part on the results of the measurements. As used here, the term "secondary use" refers to permitted unlicensed use of an unused channel in a spectrum region that is normally licensed or otherwise regulated for other communication activity, such as commercial broadcasting.

Figure 1:
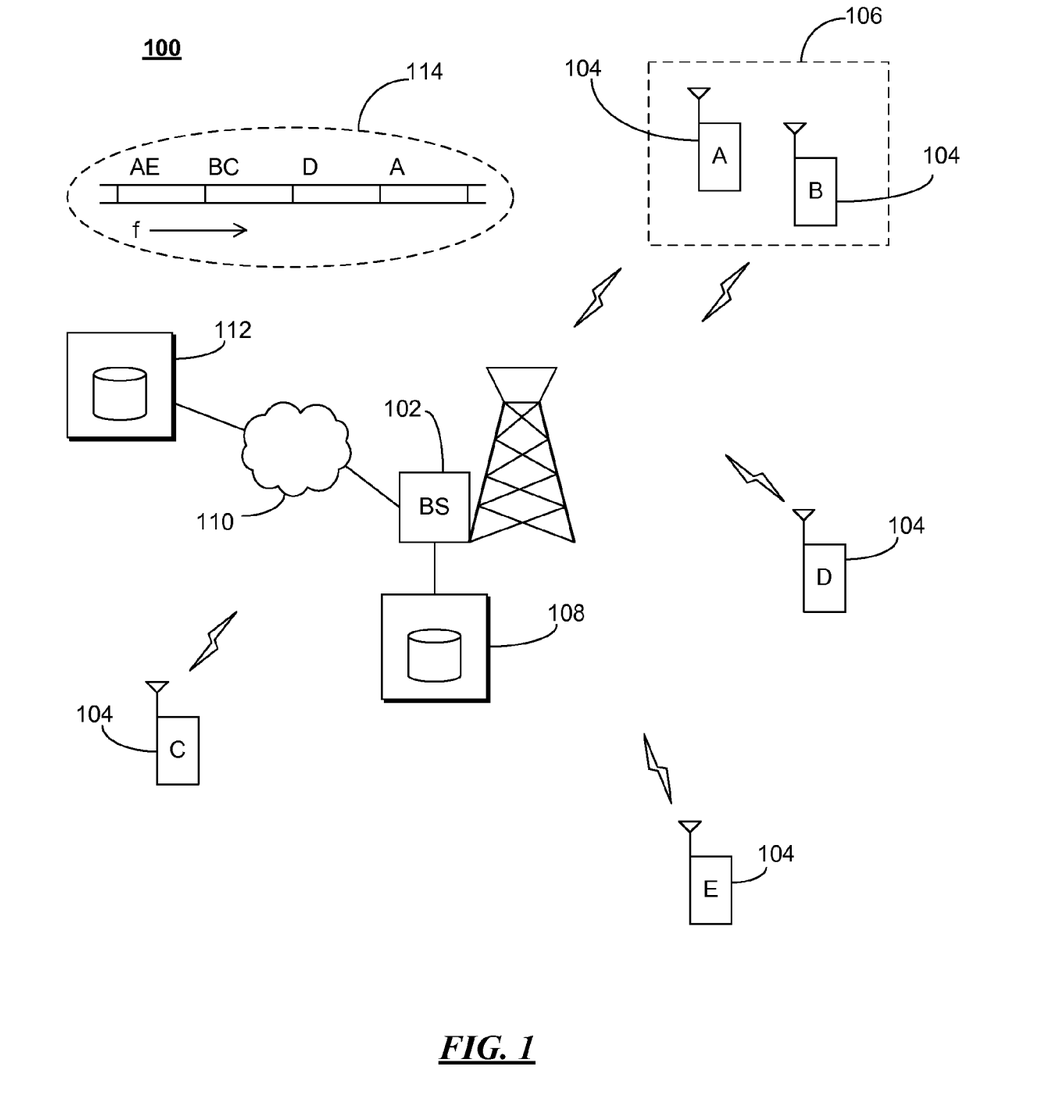
FIG. 1 shows a system schematic diagram of a narrowband communication system, in accordance with an embodiment of the invention.

Referring to FIG. 1, there is shown a system schematic diagram of a secondary use communication system 100, in accordance with an embodiment of the invention. The secondary use communication system may be a narrowband communication system, such as a public safety radio system. The system comprises a base station 102, and a plurality of subscriber units 104, here individually labeled A-E. The base station includes a fixed radio station which controls radio communication with, and among, the subscriber units, and between the subscriber units and other entities via network links connected to the base station. The base station may facilitate radio communication with the subscriber units over a wide geographic area, such as in public safety radio systems, but may also be applied to more local radio communication systems as well. The subscriber units may be mobile stations which may move throughout the region served by the base station, as well as into other regions serviced by other base stations under appropriate circumstances. Alternatively, the subscriber units may be dedicated radios placed in various known positions throughout the region serviced by the base station, and in communication with the base station. The subscriber units may be, for example, hand held two-way radios for communicating voice and data, as well as other wireless radio device such as wireless local area clients, depending on the design of the radio system. Generally, the subscriber units will be distributed geographically in the radio service area of the base station. The subscriber units may be substantially isolated from each other, or they may be co-located with other subscriber units, or a combination of both. In the present example, subscriber units A and B are substantially co-located, as indicated by box 106. As such, subscribers A and B will experience similar channel conditions between their location and the base station, as well as between their location and any wideband transmitters in the area.

A narrowband communication system uses narrowband channels, generally having a channel bandwidth on the order of 12.5 kHz-150 kHz although narrower or wider channel bandwidths may be used. These channel bandwidths relate to public safety communication systems such as those specified by the Association of Public Communication Officials (APCO). In some embodiments, for example, "super narrow" channels that are 6.25 KHz wide may be used for digital narrowband communication. It should be noted that the term "channel," as used here, refers to a defined frequency band for radio communication. Although it is known that frequency channels may be divided into logical channels using, for example, time division techniques, the invention is primarily concerned with frequency divisions. Each of the subscriber units in a narrowband communication system has a radio receiver which receives channels of the prescribed narrowband bandwidth. During communication activity, the narrowband communication system operates in a portion of radio spectrum designated for narrowband communication, which may be licensed or unlicensed publicly-accessible spectrum. However, the available spectrum designated for narrowband communication may become crowded. Some forms of communication, and in particular public safety communication, require rapid channel acquisition. Under crowded conditions, with many subscriber units using the available narrowband channels, the channel acquisition time may increase to an unacceptable wait time. Furthermore, the quality of service (QoS) will also generally degrade with increased numbers of subscribers per base station, which will affect communication throughput.

To ease crowding, a narrowband communication system designed and operated in accordance with the invention is able to locate unused wideband channels in a portion of spectrum allocated to wideband communication, such as spectrum otherwise reserved for television broadcast. A wideband channel is a channel that is much wider in terms of spectrum that a narrowband channel. A TV channel of 6 MHz is considered to be wideband, but generally a channel width of 10 times the width of a narrowband channel may be considered to be a wideband channel relative to the narrowband channel. In order to use wideband channels, however, the narrowband system must ensure a given wideband channel is sufficiently free of other signals. The subscriber units may be provided with global positioning receivers, or other positioning means, allowing the subscriber units to determine and report their geographic location to the base station. The base station may keep a record of each subscriber unit's present position in a data store 108. Additionally, the base station may keep an activity log of each subscriber, allowing the base station to determine an activity level of each subscriber unit.

To locate unused, available wideband channels, the base station identifies and selects a plurality of subscriber units to be used for sensing in various known wideband channels. The selection criteria may include the activity level and geographic position of the subscriber unit. The base station selects geographically diverse subscriber units to perform narrowband measurements in a common wideband channel, as well as co-located subscriber units to perform narrowband measurements in different wideband channels at a common location. The narrowband subscriber units have a narrowband receiver and are unable to receive the entire wideband channel, so they make narrowband measurements, meaning receiving at their normal channel width in the wideband channel at a prescribed frequency location in the wideband channel.

For example, subscriber units A and B are co-located, and may be used to perform sensing measurements in different narrowband channels that are sufficiently separated but still lie within a single wideband channel; this scheme provides frequency diversity. They may also perform narrowband measurements in different wideband channels. At the same time, subscriber units C, D, and E may be used to sense other narrowband channels in other wideband channels, as well as in wideband channels also being measured by subscriber units A and B to ensure sufficiently clear channel conditions on a given wideband channel throughout the geographic region served by the base station. It will be appreciated by those skilled in the art that the few subscriber units illustrated here is merely for exemplary purposes. In practice many more subscriber units may be selected for performing measurements.

A wideband channel diagram 114 illustrates subscriber unit assignment to several wideband channels. The wideband channels may or may not be contiguous. Subscriber units A-E are assigned to perform narrowband measurements in their respective assigned wideband channel for both frequency and location or spatial diversity. Note that each wideband channel may be split into narrowband channels and they are assigned among the different subscriber units. The channel diagram 114 shows multiple wideband channels, each of which may be subdivided into narrowband channels having a bandwidth substantially equal to the receiver bandwidth of the subscriber units. Subscriber units A and E are assigned a common wideband channel for narrowband sensing to provide spatially diverse and uncorrelated sensing measurements. Similarly, subscriber units B and C are assigned to a common wideband channel, but which is a different wideband channel than the one to which units A and E are assigned in which to perform narrowband measurements. Unit D is assigned to yet another wideband channel Unit A is further assigned to another wideband channel as unit A may be relatively inactive and therefore available to perform additional measurements. Unit B and Unit A are co-located and they are assigned different wideband channels for exploiting frequency diversity. In order for the subscriber units to perform channel measurements they each will have to leave their assigned narrowband channel and tune to frequencies within their assigned wideband channel or channels.

In one embodiment, the base station determines initial wideband channels to be tested by querying a wideband channel transmitter database 112 via a network 110. The database may be maintained by a governmental entity, or under governmental mandate. The database may be queried by providing a location, such as the base station location coordinates, and the database will provide a list of wideband licensees or other primary transmitters and the channels they occupy in the region of the base station. Any channels indicated as occupied by such a query may be removed from consideration by the base station, and only the remaining, apparently unoccupied channels need to be examined. To further reduce the number of channels that are to be tested, the base station may also maintain a historical channel log in data store 108 of wideband channels that have been tested in the past. The historical channel log may identify preferred channels as well as problem channels which, despite being apparently available, as indicated by the database 112, often indicate the presence of a transmitter or other potential interference.

Once the base station decides on which subscriber units to use for performing narrowband channel sensing in the wideband channels, based on factors such as, for example, geographic location and subscriber activity level, the base station formulates and assigns a measurement regime to each identified subscriber unit by transmitting a message to each subscriber unit with its particular measurement regime. The measurement regime may be formatted in a variety of configurations, but will indicate the channel or channels to be tested in the wideband spectrum by the subscriber unit, as well as which narrowband measurements to perform, the narrowband channel location or locations within the wideband channel to be measured, and how often to measure. The message may be transmitted by conventional means, such as via a control message, for example. Upon performing their assigned measurements, the subscriber units return to their assigned narrowband channels and transmit the results to the base station, or they may tune to a special narrowband channel reserved for reporting results before retuning to their assigned narrowband channel. Once the base station has a suitable number of results from different subscribers, it may then determine which wideband channels may be unoccupied by licensed transmitters, and define narrowband channels in the identified wideband channels, and add those narrowband channels to a pool of narrowband channels for use when capacity of the system's primary narrowband channels is reached. It will further be appreciated by those skilled in the art that, while a given wideband channel maybe clear of wideband channel transmission, other narrowband operators may be transmitting within the wideband channel. In which case, the available portion of the wideband channel may be determined by narrowband channel sensing in accordance with the invention.

Figure 2:
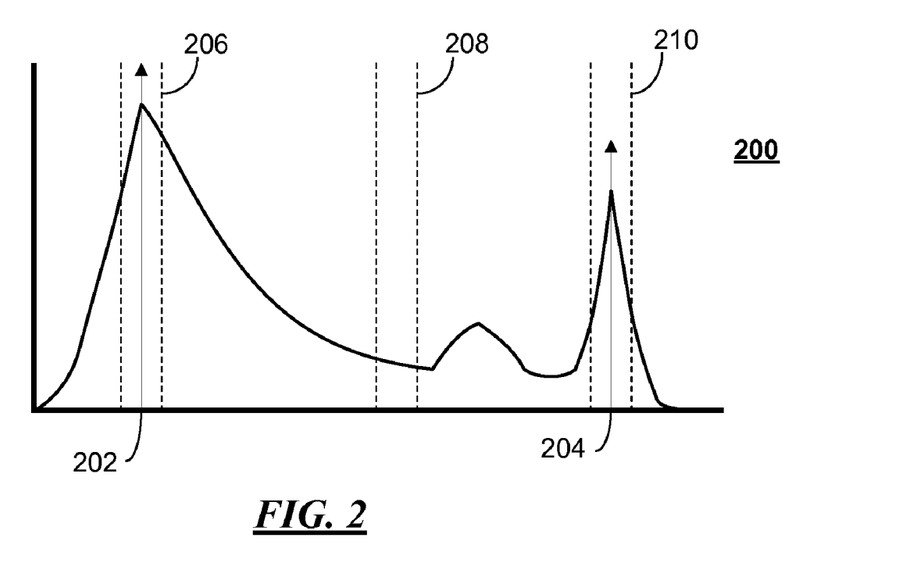
FIG. 2 shows a testing regime diagram for measuring narrowband sub-channels in a wideband channel having an incumbent NTSC television signal, in accordance with an embodiment of the invention.

FIG. 2 shows a testing regime diagram 200 for measuring different narrowband channels in a wideband channel having an incumbent analog television signal as standardized by the National Television System Committee (NTSC) of the United States, in accordance with an embodiment of the invention. A television channel is one example of a wideband channel which may be used by a narrowband system for secondary channel use. NTSC television signals are 6 MHz in width, and have pilot signals such as a luma carrier 202 at 1.25 MHz from the lower boundary of the channel, and an audio carrier 204 at 5.75 MHz from the lower boundary. Accordingly, a measurement regime seeking to identify the presence of an incumbent TV signal may include making narrowband measurements in narrowband channels 206, 208, and 210. The measurement regime transmitted to the subscriber unit making the measurement may specify one or more frequencies at which to measure, including the frequency where there will be one of the video pilot or audio carriers of the television signal. Generally, a pilot signal is a video carrier or an audio carrier in the television signal. A subscriber unit making narrowband measurements in narrowband channels 206, 208, and 210 will detect the presence of these special signals 202 and 204. The relative low level in narrowband channel 208, when compared to signal levels in 206 and 210, will correspond to an NTSC television signal. The subscriber unit may simply measure signal strength in each of the channels 206, 208, 210, and report the results, or it may examine the received signal further, such as by, for example, performing a fast Fourier transform on the received narrowband channel to determine the presence of a pilot or audio signal. If a pilot or audio signal is detected having a sufficient magnitude, the subscriber may report a positive detection instead of, or in addition to reporting the measurement data.

Figure 3:
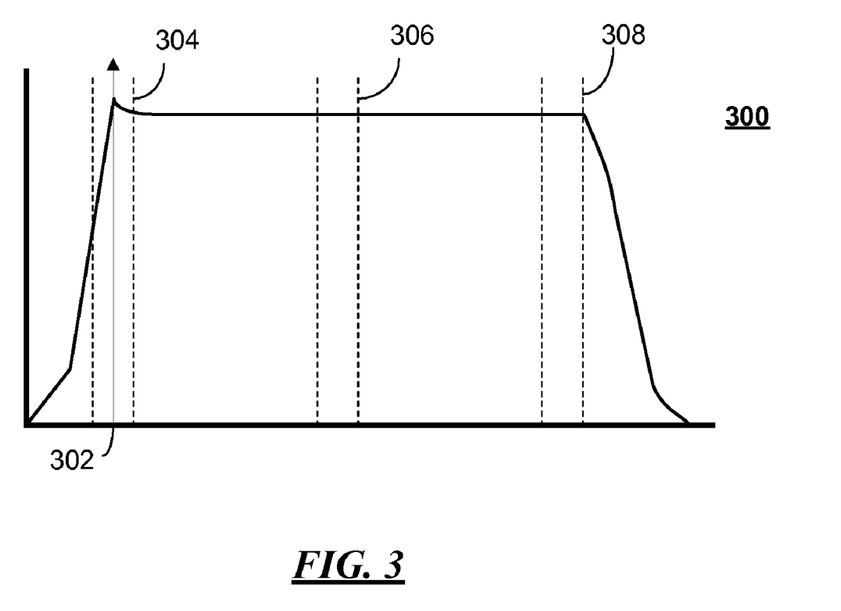
FIG. 3 shows a testing regime diagram for measuring narrowband sub-channels in a wideband channel having an incumbent digital television signal, in accordance with an embodiment of the invention.

FIG. 3 shows a testing regime diagram 300 for measuring activity in a wideband channel having an incumbent digital television (DTV) signal, in accordance with an embodiment of the invention. A digital television signal will have a relatively flat profile, although a pilot signal 302 is still detectable. Digital television signals also have a 6 MHz bandwidth. A typical measurement regime in accordance with the invention may have the subscriber unit make three measurements at 304, 306, and 308, with one (304) being centered on the pilot location 302. Alternatively, these measurements may be made by different subscriber units. To determine the presence of a digital television signal in the channel, the results of narrowband channel measurement 304 may be compared with measurements made in narrowband channels 306 and 308. If the difference in received signal strength is sufficiently low, then there is a high probability that there is a digital wideband signal presently occupying the wideband channel.

In assigning measurements to be made, the base station may indicate that the subscriber unit is to make at least one pilot measurement at a pilot location in the channel, as well as one flat measurement in a region of the channel away from the pilot signal location. Further, the location of the pilot signal within the 6 MHz channel can be different for different TV transmitters, which may not be known a priori and the base station can direct the subscribers to test these different pilot signal locations. Once a pilot signal location is identified for a channel it can be used to update the measurement regime for the channel.

Figure 4:
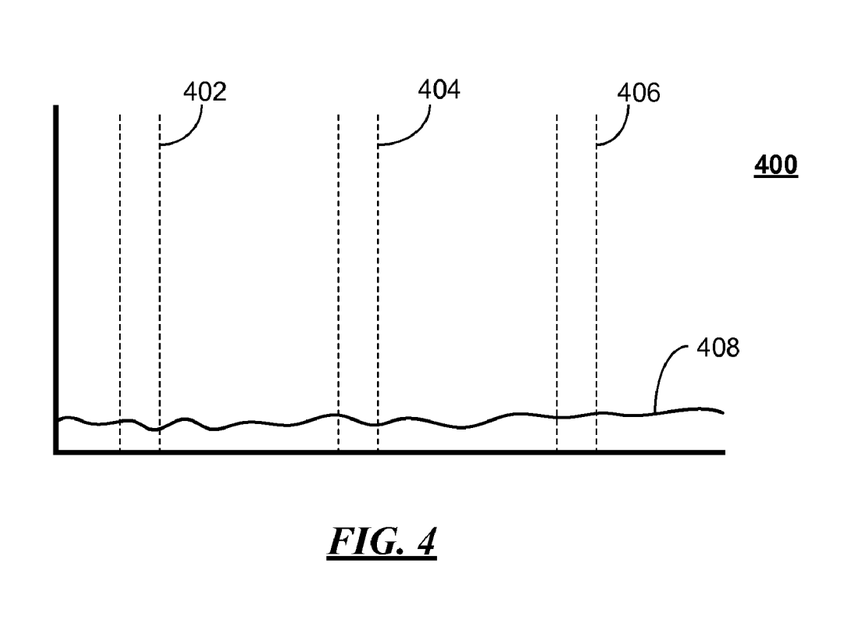
FIG. 4 shows a testing regime diagram for measuring narrowband sub-channels in a wideband channel having no incumbent wideband signal, in accordance with an embodiment of the invention.

FIG. 4 shows a testing regime diagram 400 for measuring narrowband sub-channels in a wideband channel having no incumbent wideband signal, in accordance with an embodiment of the invention. If the wideband channel has no wideband activity, then narrowband channel measurements 402, 404, and 406 will only find a relatively low noise floor 408, indicating the channel is available to be subdivided into narrowband signals.

Figure 5:
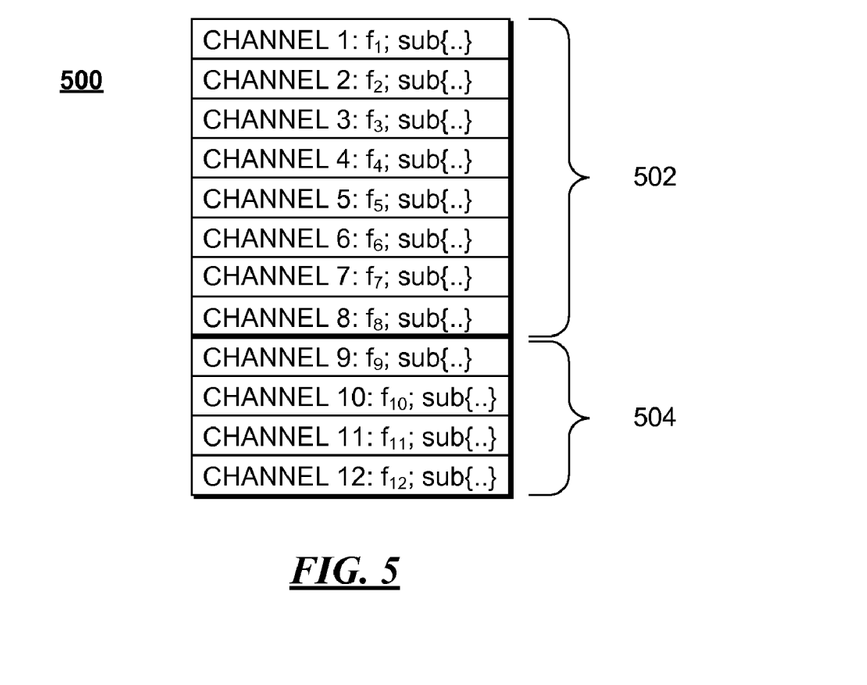
FIG. 5 shows a channel map produced and maintained by a narrowband base station, in accordance with an embodiment of the invention.

FIG. 5 shows a narrowband channel map 500 produced and maintained by a narrowband base station, in accordance with an embodiment of the invention. The narrowband channel map show available narrowband channel resources for use in commencing communication activity. The present map is an example of how the base station may organize narrowband channel availability, narrowband channel frequency location, and subscriber assignment. Many other arrangements may be used equivalently. The present example illustrates how secondary narrowband channels defined in unused or otherwise available wideband channel space may be added to a pool of primary narrowband channels. The primary narrowband channels 502 are defined in a spectrum region reserved for narrowband communication carried out by the narrowband communication system. These primary narrowband channel locations may be licensed to the narrowband communication system operator. Each narrowband channel may be identified by its frequency ($f_1$-$f_8$). Additionally, a subscriber assignment record may be associated with each narrowband channel, shown here as "sub { . . . }," where the particular subscriber units assigned to the narrowband channel would be provided between the brackets in the subscriber list. The primary narrowband channels may be fixed in frequency since they are defined in a spectrum region that is reserved for the narrowband communication system. The primary narrowband channels may be used first until all primary narrowband channels are operating at capacity. The secondary narrowband channels 504 are not fixed, and may change from time to time as they are defined in a region of spectrum reserved for wideband or other users/transmitters. If a new wideband operator commences operation in the region of the narrowband system, a wideband channel previously used by the narrowband channel as a secondary resource may no longer be available. Likewise, if a wideband operator ceases operation in the region of the narrowband system, it's wideband channel may become available for secondary use by the narrowband system. The narrowband channel assignment list 500 may be maintained in a data store of the base station such as data store 108.

Figure 6:
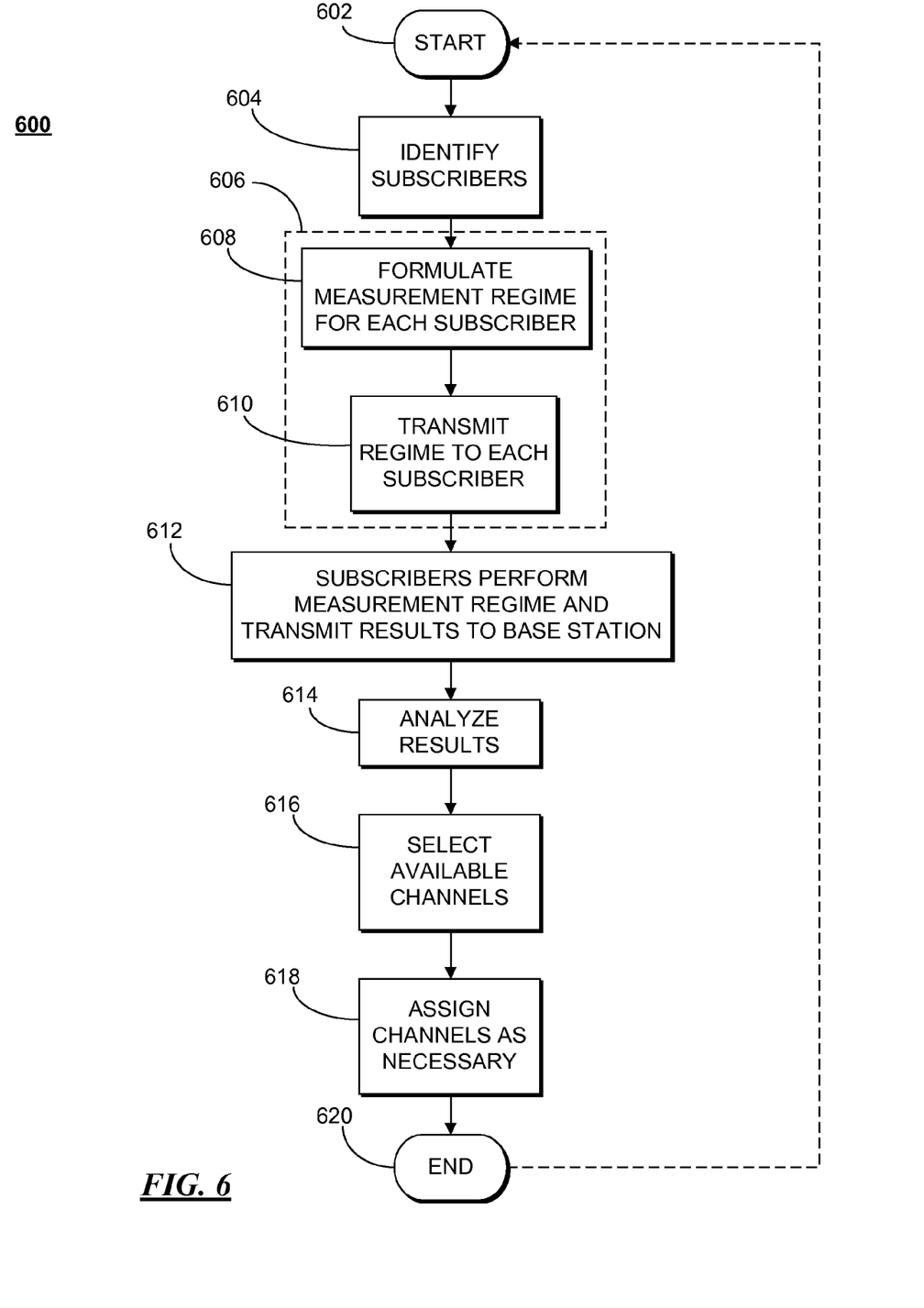
FIG. 6 shows a flow chart diagram of a method of identifying available wideband channels for use by a narrowband communication system, in accordance with an embodiment of the invention.

FIG. 6 shows a flow chart diagram 600 of a method of identifying available wideband channels for use by a secondary use communication system, such as a narrowband communication system, in accordance with an embodiment of the invention. At the start 202 of the present example, the narrowband system comprises a plurality of narrowband subscriber units which are geographically dispersed in a region served by a base station. The subscriber units are assigned to various primary narrowband channels which are reserved for narrowband communication. In order to assure sufficient narrowband channel resource capacity, the base station may require additional narrowband channels that are defined in unused bands in another spectrum region reserved for another communication type, such as wideband communication. An example of wideband communication is television broadcast, which uses 6 MHz wide channels. Any candidate wideband channel must be sufficiently free of interfering signals throughout the region served by the base station. As such, the base station will utilize subscriber units located at various positions within the served region that will sufficiently represent channel conditions in the wideband channels throughout the serving area. Accordingly, an initial process is to identify subscriber units to be used in locating available secondary channels (604). Subscribers units are selected based on their present location as reported by the subscriber units with the assistance of GPS receivers in the subscriber units, a running record of which may be maintained by the base station or other infrastructure equipment. Furthermore, other factors may be used in selecting subscriber units, such as their recent activity level, whether they have been designated as being unavailable for use in sensing, whether they are presently involved in communication activity, and so on. The system may select multiple subscriber units in different locations to a given channel to ensure the channel is clear in the serving area, as well as multiple units at similar locations to test different channels at those locations.

Once a sufficient number of subscriber units are identified, the method then assigns a measurement regime to each subscriber (606). The wideband channel may be subdivided into narrowband channels, and the subscribers are assigned to perform measurements in one or more of these narrowband channel divisions. The subdividing maybe performed using the knowledge of what kind of wideband channel is being examined. For example, television channels with incumbent signals have certain features, such as pilot signals and other characteristic signal levels in the channel, which occupy certain regions of the wideband channel. These measurement regime is accordingly formulated to detect the presence of these feature. The assigning process includes formulating or generating a measurement regime for each selected subscriber unit (608). For example, using subscriber units (104) of FIG. 1, labeled A-E, and assume that the wideband channels represented by FIGS. 2-4 are different wideband channels designated channels 2-4, respectively, the measurement regimes for each subscriber may be as follows:

A {chan 2; P1, F1: chan 4; P1, F1, F2: chan 3; F2}
B {chan 3; P1, F1}
C {chan 3; P1, F1, F2}
D {chan 4; P1, F1}
E {chan 2, P1, F1, F2}

According to this assignment designation, subscriber unit A is assigned to channel 2 (FIG. 2) to measure pilot band P1 (206) and flat band F1 (208). Furthermore, subscriber unit A is assigned to channel 4 (FIG. 4) to measure narrowband channel (402), which is located where a pilot P1 would be located if there is an incumbent television signal present in the wideband channel, F1 (404), and F2 (406). Subscriber A is further assigned to measure narrowband channel F2 (308) of wideband channel 3. Note that Subscriber A and B are both measuring narrowband channels in wideband channel 3. The other subscriber units are similarly assigned to their respective channels. The channel allocation scheme is optimized to exploit different diversity metrics, such as frequency diversity, time diversity, spatial diversity, user diversity, and so on. The measurement regime may specify a band for each pilot or flat measurement location, or it may simply provide a channel number and sub-channel designator (P1, F1, etc.) which the subscriber unit uses with a locally stored look-up table to determine the frequency for each pilot and flat measurement. Furthermore, the pilot and flat measurements may entail different types of measurement. For example, a pilot measurement intends to locate a carrier. Accordingly, the subscriber may tune to the designated pilot frequency, sample a narrowband channel width of spectrum, and perform a fast Fourier transform to determine the present of a carrier. Other operations such as correlations may be performed to ensure the presence or absence of a carrier. Given the general absence of spectral features in the flat sub-channels, those measurements may simply involve a radio signal strength indication (RSSI) measurements. Additionally, if the wideband channel has incumbents with digital modulation, symbol rate detectors can be employed in the flat sub-channels. Once the measurement regimes are formulated, they are transmitted to their respective subscriber units (610).

Once the subscriber units receive their measurement regime, they commence carrying out the required narrowband measurements and transmit the results back to the base station (612). The results may be the raw measurement data, or the subscriber units may be provided with thresholds to measure against and report whether the thresholds were exceeded, or a combination of results may be reported. The results may then be analyzed and combined for a channel (614) by the base station or other system infrastructure equipment. A given wideband channel under consideration may, for example, be rejected if any subscriber detected a potentially interfering signal in the channel. Alternatively, the narrowband measurement regime may be reformulated to identify available space in a wideband channel in the presence of other narrowband signals in the wideband channel. Likewise, channels with poor conditions due to distortion may be rejected. By analyzing the results, each assigned channel may be accepted or rejected. Once the entire list of channels has been analyzed with their respective measurement results, the base station may then select the available channels (616). These available channels may be used to define secondary narrowband channels which are added to a channel resource list, such as list 500. These secondary channels may be assigned as needed as capacity requirements of the narrowband communication system changes (618). The method may then terminate (620) for a period of time. However, the method may be repeated periodically to ensure that any secondary channels remain clear, or remove secondary channels which are no longer available as well add new secondary channels that have become available.

Figure 7:
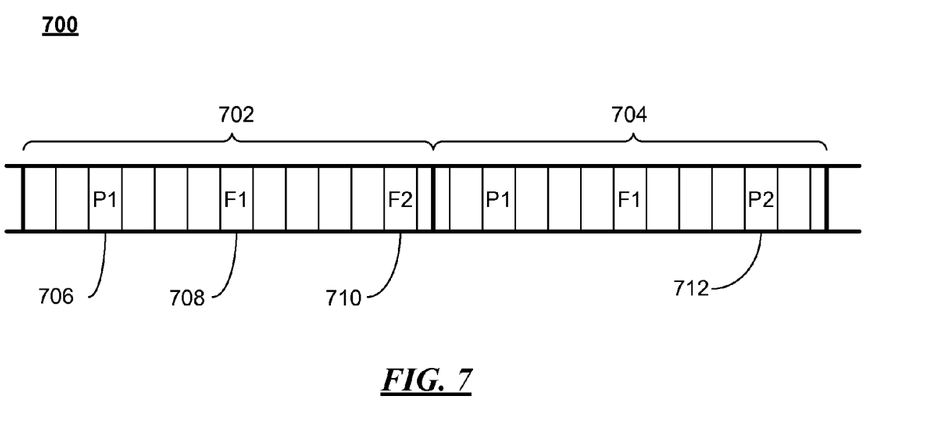
FIG. 7 shows a channel diagram of wideband channels which are subdivided into narrowband channels, in accordance with an embodiment of the invention.

FIG. 7 shows a channel diagram 700 of two wideband channels 702 and 704. Each of the wideband channels may be subdivided into narrowband channels for use by the narrowband communication system. The subdivisions shown are for illustration only and are not meant to suggest a particular scale or format with regard to the relationship between the wideband channel width and the narrowband channel width. The narrowband channels generally have a bandwidth substantially equal to the receiver bandwidth of the subscriber units, although in some cases the subscriber units may be configured to receive a wider bandwidth than the narrowband channels. The base station may assign one or more subscriber units to perform narrowband measurements within the wideband channel. For example, a subscriber unit may be assigned to measure a narrowband channel 706 where a pilot signal P1 would be expected to found if there is an incumbent television broadcast signal occupying the wideband channels. Likewise, flat channel measurements F1 and F2 may be performed in narrowband channels 708 and 710, respectively, for comparison with the measurement of narrowband channels 706. These measurements may be performed by one subscriber unit, or they may be delegated to different subscriber units, as well as assigning the same measurements to be made by different subscriber units that are geographically diverse. Narrowband channel 712 in wideband channel 704 illustrates that other pilot signal measurement may be taken within a wideband channel.

Figure 8:
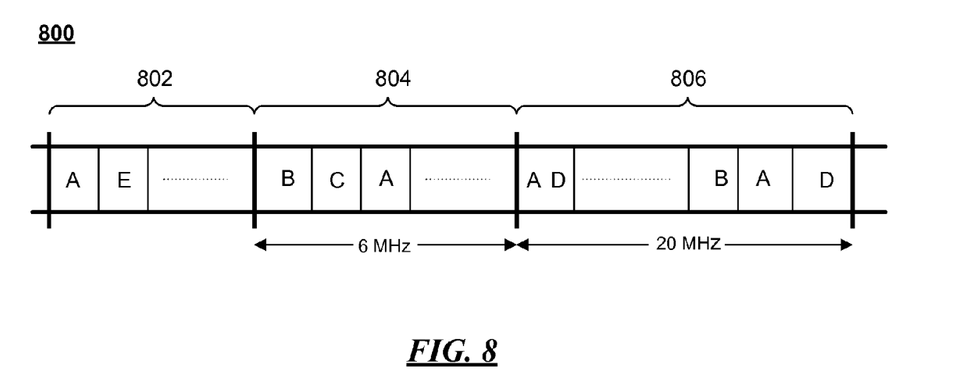
FIG. 8 shows a channel diagram of wideband channels having different channel widths and subscriber assignments to narrowband channels within the wideband channels, in accordance with an embodiment of the invention.

FIG. 8 shows a channel diagram 800 of wideband channels having different channel widths and subscriber assignments to narrowband channels within the wideband channels, in accordance with an embodiment of the invention. Three wideband channels 802, 804, and 806 are shown as examples. Wideband channels 804 and 806 have channels widths of 6 MHz and 20 MHz, respectively, Wideband channel 802 may have a different width. Each of the wideband channels may be subdivided into narrowband channels, as indicated by the divisions. The narrowband channels have a width substantially equal to, or narrower than, the receiver bandwidth of the subscriber units, as it is contemplated that subscriber units may be self-configurable to use different narrowband channel widths for different types of communication activity. The channel diagram shows subscriber assignment to narrowband divisions within the wideband channels for sensing or measuring radio activity levels in those narrowband channels. The subscriber units are represented by the designation of the letters A-E, corresponding to subscriber units A-E of FIG. 1. Subscriber units A and B are substantially co-located. For the present example, subscriber unit A has lower loading, meaning a relatively low communication activity level. Accordingly, subscriber unit A is assigned to make measurements in narrowband channels in all three wideband channels, with two narrowband channels in wideband channel 806. Because wideband channel 806 is so wide, relative to the narrowband bandwidth, different narrowband channels within wideband channel 806 may experience independent fading, thus measurements taken in different narrowband channels that are substantially separated within wideband channels 806 may be used to exploit frequency diversity. As subscribers A and B as co-located, they may be assigned to substantially separated narrowband channels. Assigning A and B to different narrowband channels, via their respective measurement regimes, allows measurement of uncorrelated fading. Furthermore, as indicated by the assignment of subscribers A and D to the same narrowband channel in one instance, since they are geographically separated, their measurements of the same narrowband channel provide a measure of spatial diversity. The base station may sub-divide the wideband channels into a pre-selected number of narrowband channels, where the pre-selected number of narrowband channels is designed to capture essential spectral characteristics of the wideband channel to allow a determination as to the presence of a wideband, or other signal in the wideband channel. The base station assigns a sufficient number of narrowband channel measurements to adequately determine the wideband channel content, and particularly the presence (or absence) of a wideband channel transmitter. However, as indicated, the lack of a wideband signal in the wideband channel does not assure the narrowband system has freedom to operate anywhere within the wideband channel.

Figure 9:
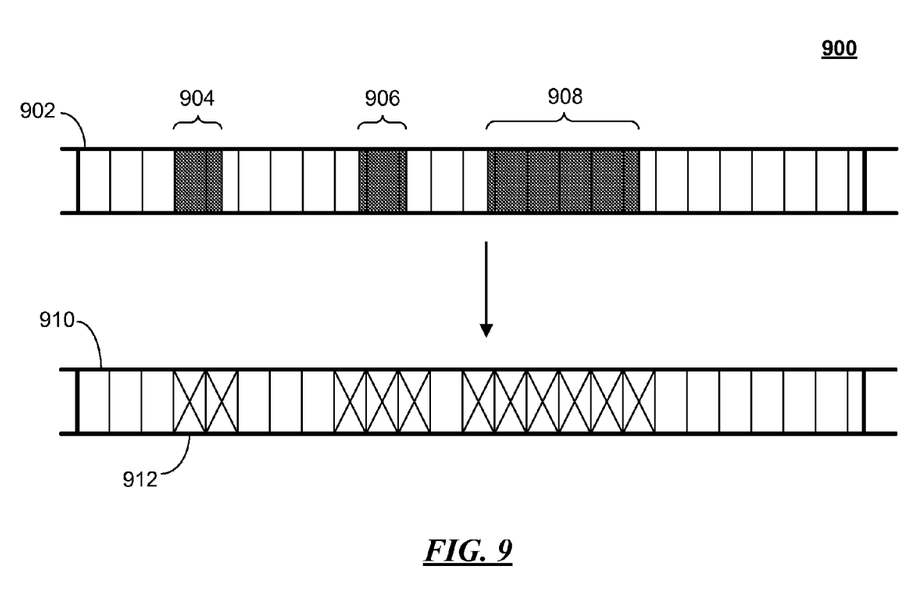
FIG. 9 shows a channel mapping diagram of removing narrowband channels from consideration due to the presence of interference in the wideband channel, in accordance with an embodiment of the invention.

FIG. 9 shows a channel mapping diagram 900 of removing narrowband channels from consideration due to the presence of interference in the wideband channel, in accordance with an embodiment of the invention. A wideband channel 902 is free of wideband channel transmission activity, but has interfering signals 904, 906, and 908, which occupy some of the narrowband channel divisions designated by the base station. These interfering signals may be produced from a wide variety of sources, including other narrowband secondary-use operators. During the course of receiving measurement results from subscriber units, the base station may determine the lack of a wideband signal, but also determine there are other signals in the wideband channels. Accordingly, the base station may assign further measurements to be made to determine width of the other signals. As shown in the resulting available channel map 910, narrowband channels which are substantially affected by the other signal are removed from consideration for use, as indicated by the "X" in the corresponding narrowband channel divisions.

This invention can be embodied in other forms without departing from the spirit or essential attributes thereof Accordingly, reference should be made to the following claims, rather than to the foregoing specification, as indicating the scope of the invention.

What is claimed is:

1. A method of identifying available wideband channels for use by a narrowband communication system by a base station of the narrowband communication system, the method comprising:

identifying a plurality of subscriber units of the narrowband communication system in a geographic region, including identifying a location of each of the plurality of subscriber units as reported by the subscriber units;

assigning a narrowband measurement regime to each of the plurality of subscriber units, wherein the narrowband measurement regime identifies at least one narrowband channel to be measured by the subscriber unit in an assigned wideband channel using a narrowband measurement performed in the assigned wideband channel;

receiving measurement results from the plurality of subscriber units, wherein the measurement results are obtained by the subscriber units upon performing their respective measurement regime; and determining an availability of wideband channels based at least in part on the measurement results.

2. The method of claim 1, further comprising:

determining available wideband channels in a geographic region of the base station for use in assigning the measurement regime to the subscriber units, performed prior to assigning a measurement regime to each of the plurality of subscriber units; and wherein assigning the measurement regime to each of the plurality of subscriber units identifies at least one of the available wideband channels.

3. The method of claim 2, wherein determining available wideband channels comprises querying a wideband channel database which maintains a list of wideband channels being used in the geographic region of the base station; and wherein the base station sub-divides the wideband channels into a pre-selected number of narrowband channels.

4. The method of claim 1, wherein the narrowband measurement of the measurement regime includes at least a pilot measurement to be made at a pilot signal location within the assigned wideband channel.

5. The method of claim 4 wherein the measurement regime comprises at least two narrowband measurements to be made in the assigned wideband channel, wherein the measurement regime further includes at least one flat measurement in a different portion of the assigned wideband channel than the location of the pilot measurement which is compared with the pilot measurement.

6. The method of claim 4, wherein the wideband channel is a television broadcast channel, the pilot signal is at least one of a video carrier or an audio carrier of a television signal.

7. The method of claim 1, wherein assigning a measurement regime comprises assigning different narrowband channels to at least two subscriber units which are co-located and wherein the different narrowband channels are separated in the frequency domain and are subjected to uncorrelated fading.

8. The method of claim 1, wherein assigning a measurement regime comprises assigning a common narrowband channel to at least two subscriber units which are substantially geographically separated.

9. The method of claim 1, wherein determining an availability of wideband is further based in part on a historical ranking of channels which identifies wideband channels used as a result of performing the method on previous occasions.

10. A narrowband communication system, comprising:
a base station, the base station maintaining a channel list and a subscriber location list; and
a plurality of subscriber units located in a serving area of the base station and in communication with the base station, wherein the subscriber units are configured to determine and report their location to the base station;
wherein the base station is configured to formulate and assign narrowband measurement regimes to each of the plurality of subscriber units, the measurement regimes identifying at least one assigned wideband channel in which to perform a narrowband measurement, and upon receiving results of the narrowband measurements from the plurality of subscriber units the base station determines an availability of wideband channels for secondary narrowband use.

11. The narrowband communication system of claim 10, wherein the base station is operably coupled to a wideband channel transmitter database which indicates wideband channels that are in use in a region of the base station, and wherein the base station formulates the narrowband measurement regimes to avoid the wideband channels that are in use.

12. The narrowband communication system of claim 10, wherein the narrowband measurement regimes include at least a pilot measurement to be made at a pilot signal location within the at least one assigned wideband channel.

13. The narrowband communication system of claim 12, wherein the measurement regimes comprise at least two narrowband measurements to be made in the at least one assigned wideband channel, wherein the measurement regime further includes at least one flat measurement in a different portion of the assigned wideband channel than the location of the pilot measurement, and wherein the flat measurement is compared with the pilot measurement.

14. The narrowband communication system of claim 12, wherein the wideband channels are television broadcast channels, the pilot signal is at least one of a video carrier or an audio carrier of a television signal.

15. The narrowband communication system of claim 10, wherein the base station formulates the narrowband measurement regimes so as to assign different wideband channels to at least two subscriber units which are substantially co-located.

16. The narrowband communication system of claim 10, wherein the base station formulates the narrowband measurement regimes so as to assign a common wideband channel to at least two subscriber units which are substantially geographically separated.

17. The narrowband communication system of claim 10, wherein the base station further comprises a historical ranking of wideband channels to indicate preferred wideband channels, and the base station is further configured to determine the availability of wideband channels based in part on the historical rankings.

18. A method for adding secondary narrowband channels to a pool of narrowband channels, comprising:
assigning at a base station a narrowband measurement regime to each of a plurality of subscriber units in communication with the base station, each measurement regime indicating a wideband channel in which to perform narrowband measurements;
performing the narrowband measurement at each of the subscriber units and obtaining a measurement result;
transmitting the measurement result from each subscriber unit to the base station;
analyzing the measurement results to determine available wideband channels; and
defining secondary narrowband channels in an available wideband channel.

19. The method of claim 18, wherein the wideband channel is a television broadcast channel.

20. The method of claim 18, wherein assigning the narrowband measurement regime comprises:
determining a location of each of the subscriber units; and
selecting different wideband channels for subscriber units that are substantially co-located, and selecting a common wideband channel for at least two subscriber units that are substantially separated geographically.

21. The method of claim 18, wherein assigning the narrowband measurement regime is based on both the availability of a subscriber to scan multiple narrowband subchannels and the subscriber having bandwidth capability for handling the bandwidth associated with the narrowband subchannels.

* * * * *

UNITED STATES PATENT AND TRADEMARK OFFICE
CERTIFICATE OF CORRECTION

PATENT NO.        : 8,107,887 B2                                    Page 1 of 1
APPLICATION NO.   : 12/394955
DATED             : January 31, 2012
INVENTOR(S)       : Rao et al.

It is certified that error appears in the above-identified patent and that said Letters Patent is hereby corrected as shown below:

On the Face Page, in Field (54), in Column 1, Line 2, and in Column 1, Line 2, in Title, after "NARROWBAND" delete "WIDEBAND".

In Column 10, Line 40, delete "thereof" and insert -- thereof. --, therefor.

Signed and Sealed this
Twenty-fifth Day of December, 2012

David J. Kappos
*Director of the United States Patent and Trademark Office*